United States Patent [19]

Novajovsky

[11] Patent Number: 4,663,565

[45] Date of Patent: May 5, 1987

[54] MAGNETRON HAVING A RADIO FREQUENCY GASKET RETAINER

[75] Inventor: William A. Novajovsky, Manheim Township, Lancaster County, Pa.

[73] Assignee: RCA Corporation, Princeton, N.J.

[21] Appl. No.: 713,760

[22] Filed: Mar. 20, 1985

[51] Int. Cl.$^4$ .............................................. H01S 1/15

[52] U.S. Cl. ................................ 315/39.51; 313/341; 277/9.5; 277/11

[58] Field of Search ............... 315/39.51, 39.53, 39.75, 315/39.71; 313/337, 341, 344; 29/271; 277/9.5, 11

[56] References Cited

U.S. PATENT DOCUMENTS

| | | | |
|---|---|---|---|
| 917,388 | 4/1909 | Welch, Jr. | |
| 1,435,887 | 11/1922 | Anderson | |
| 2,093,326 | 9/1937 | Legat | 70/156 |
| 2,152,853 | 4/1939 | Packer | 238/349 |
| 2,385,202 | 9/1945 | Haas, Jr. et al. | 285/211 |
| 2,568,390 | 9/1951 | Gehrke | 29/285 |
| 2,598,169 | 5/1952 | Hubbell | 116/150 |
| 2,659,950 | 11/1953 | West | 24/73 |
| 3,261,086 | 7/1966 | Dunn | 29/423 |
| 4,044,279 | 8/1977 | Tsuzurahara et al. | 315/39.51 |
| 4,204,138 | 5/1980 | Koinuma et al. | 315/39.51 |
| 4,205,256 | 5/1980 | Oguro | 315/39.51 |
| 4,221,039 | 9/1980 | Smith | 29/271 |
| 4,325,003 | 4/1982 | Hatayama | 315/39.51 |
| 4,494,034 | 1/1985 | Keller | 313/341 |

FOREIGN PATENT DOCUMENTS

| | | | |
|---|---|---|---|
| 933215 | 4/1948 | France | |
| 1448681 | 10/1965 | France | 313/341 |

*Primary Examiner*—Larry Jones
*Attorney, Agent, or Firm*—Eugene M. Whitacre; Dennis H. Irlbeck; Vincent J. Coughlin, Jr.

[57] ABSTRACT

A magnetron includes an evacuated envelope having an output dome insulator affixed to a conductive annular output support ring. The output support ring has a substantially flat support surface adjacent to the output dome insulator and a step-like peripheral sidewall which includes a first portion and an outwardly extending second portion. A weld flange circumscribes the output support ring and is attached to the second portion of the peripheral sidewall. A conductive annular radio frequency gasket is disposed on the flat support surface of the output support ring. The structure is improved by the inclusion of a plurality of gasket retainers disposed around the periphery of the r.f. gasket. Each of the gasket retainers comprises a continuous elongated strip of substantially flat resilient material bent to form a substantially V-shaped envelope engaging portion. The envelope engaging portion of each of the gasket retainers includes a long leg section extending along the first portion of its peripheral sidewall of the output support ring and a short leg section which is contiguous with the long leg section and is in contact with the weld flange circumscribing the output support ring. Each of the gasket retainers further includes a gasket engaging portion contiguous with the other end of the long leg section for contacting and retaining the r.f. gasket against the flat support surface of the output support ring.

8 Claims, 4 Drawing Figures

MAGNETRON HAVING A RADIO FREQUENCY GASKET RETAINER

BACKGROUND OF THE INVENTION

The present invention relates to a large power magnetron for use in industrial applications and more particularly, to a structure for retaining a radio frequency (r.f.) gasket on such a magnetron.

Large power magnetrons, such as the RCA 8684, are capable of continuously generating r.f. power of 30 kilowatts at very high efficiency. However, care must be exercised by the tube operator to ensure that the r.f. seals between the magnetron and the external output circuitry, which includes a waveguide transition member having an insulating sleeve therein that accommodates an output dome insulator of the magnetron, are adequate to limit the r.f. radiation to safe and acceptable values. To this end, a conductive r.f. gasket is disposed between a conductive output support ring of the magnetron and the waveguide transition member which is secured to a waveguide. In some applications, the magnetron is inserted into the transition member in an inverted orientation so that the r.f. gasket is directed downwardly. In the prior art, it is known to use small strips of aluminum foil tape to retain the r.f. gasket in electrical contact with the output support ring of the magnetron. However, there is evidence that occasionally the tape fails to retain the r.f. gasket in place, especially when the magnetron is inverted for installation. In such cases, the r.f. gasket becomes lodged between the output dome insulator of the magnetron and the insulating sleeve of the waveguide transition member. As a result, arcing occurs and damages the output dome insulator of the magnetron causing premature failure of the magnetron.

SUMMARY OF THE INVENTION

A magnetron includes an evacuated envelope having an output dome insulator affixed to a conductive annular output support ring. The output support ring has a substantially flat support surface adjacent to the output dome insulator and a step-like peripheral sidewall which includes a first portion and an outwardly extending second portion. A weld flange circumscribes the output support ring and is attached to the second portion of tne peripheral sidewall. A conductive annular radio frequency gasket is disposed on the flat support surface of the output support ring. The structure is improved by the inclusion of a plurality of gasket retainers disposed around the periphery of the r.f. gasket. Each of the gasket retainers comprises a continuous elongated strip of substantially flat resilient material bent to form a substantially V-shaped envelope engaging portion. The envelope engaging portion of each of the gasket retainers includes a long leg section extending along the first portion of the peripheral sidewall of the output support ring and a short leg section which is contiguous with tne long leg section and is in contact with the weld flange circumscribing the output support ring. Each of the gasket retainers further includes a gasket engaging portion contiguous with the other end of the long leg section for contacting and retaining the r.f. gasket against the flat support surface of the output support ring.

DETAILED DESCRIPTION OF THE PREFERRED EMBODIMENT

Figure 1:
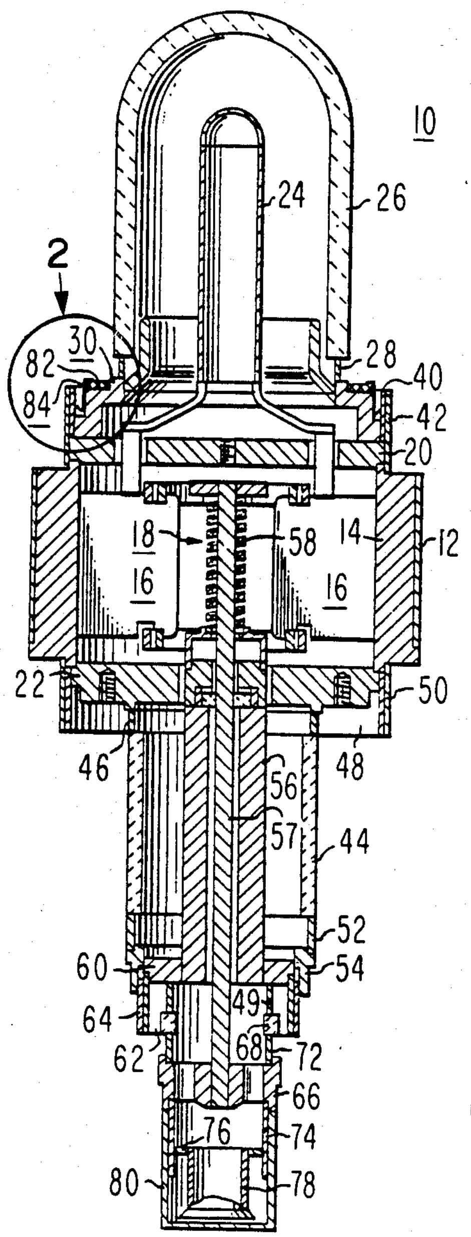
FIG. 1 is a longitudinal cross-sectional view of a magnetron having a plurality of gasket retainers in accordance with the present invention.

A large power magnetron 10 is shown in FIG. 1. The magnetron 10 includes an evacuated envelope 12 of ceramic-metal construction. An anode cylinder 14 forms a portion of the envelope 12. The anode cylinder 14 is provided with a plurality of radial anode vanes 16 secured to the inner surface of the anode cylinder. Centrally disposed within the anode cylinder 14 is a high temperature cathode assembly 18. A pair of magnetic pole pieces 20 and 22 are disposed on opposing ends of the anode cylinder 14 and attached thereto. An antenna 24 is connected at one end to the radial anode vanes 16 and extends through the magnetic pole piece 20. The antenna 24 is enclosed within an output dome 26, preferably formed of a high aluminum ceramic material. The output dome 26 is fixedly attached, for example, by brazing to an output support flange 28 which, in turn, is brazed to a conductive annular output support ring 30. As shown in greater detail in FIG. 2, the annular output support ring 30 includes a collar 32, to which the support flange 28 is brazed. The output support ring 30 further includes a substantially flat support surface 34 adjacent to the collar 32 and a step-like peripheral sidewall including a first portion 36 and an outwardly extending second portion 38. A cylindrical weld flange 40 circumscribes the annular output support ring 30 and is attached to the second portion 38 of the peripheral sidewall, for example by brazing. A cylindrical upper anode flange 42 is attached, also by brazing, to one end of the anode cylinder 14. The weld flange 40 and the upper anode flange 42 are heliarc welded together at their distal ends to close the upper end of the envelope 12. The other end of the envelope 12, shown in FIG. 1, comprises a hollow cylindrical cathode insulating member 44, preferably of high alumina ceramic material, which is attached, by brazing, to a pole piece flange 46 which, in turn, is brazed to the pole piece 22. A pole piece weld flange 48 is brazed to the periphery of the pole piece 22 and a lower anode flange 50 is brazed to the other end of the anode cylinder 14. The pole piece weld flange 48 and the lower anode flange 50 are heliarc welded together at their distal ends to attach the pole piece 22 to the anode cylinder 14. The other end of the cathode insulating member 44 is brazed to a cathode support flange 52 which, in turn, is brazed to a filament-cathode terminal contact 54. The cathode assembly 18 includes an outer conductor 56 and an inner conductor 57, disposed coaxially within and insulated from, the outer conductor 56. The conductors 56 and 57 extend through the center of the magnetic pole piece 22 and are connected to a low angle helically wound filament 58. The outer conductor 56 is attached to a transition plate 60 which is brazed around its periphery to a transition plate flange 62. A filament cathode terminal flange 64 is brazed to the terminal contact 54 and heliarc welded to the transition plate flange 62. The inner conductor 57 is connected to a filament terminal contact 66 which is insulatingly attached at one end to the transition plate 60 by means of an isolation insulator 68, preferably formed of high alumina ceramic material. One end of the isolation insulator 68 is brazed to an output conductor collar 70. The collar 70, in turn, is brazed to the transition plate 60. The other end of the isolation insulator 68 is brazed to a filament terminal collar 72 which is attached to the filament terminal contact 66. The other end of the filament terminal contact 66 includes an exhaust sleeve 74 having an exhaust flange 76 attached thereto. A copper exhaust tubulation 78 (shown as being crimped shut) is brazed to the exhaust flange 76. A protective cap 80 is disposed over the exhaust tubulation 78.

An r.f. wire mesh gasket 82 having an outside diameter of about 91.4 mm, an inside diameter of about 76.2 mm and a height of about 1.3 mm and made of Monel is disposed on the substantially flat support surface 34 of the output support ring 30 and secured thereon by a plurality of novel r.f. gasket retainers 84. Four equally spaced apart r.f. gasket retainers 84 retain the r.f. gasket 82 in contact with the support surface 34 even when the magnetron is inverted.

Figure 2:
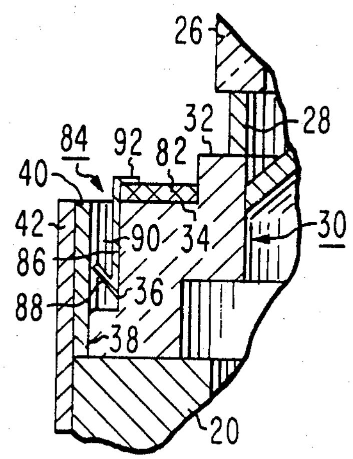
FIG. 2 is an enlarged sectional view of the portion of the magnetron within circle 2 of FIG. 1.
Figure 4:
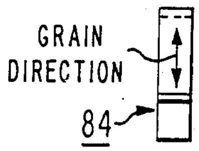
FIG. 4 is a plan view taken along line 4—4 of FIG. 3.
Figure 3:
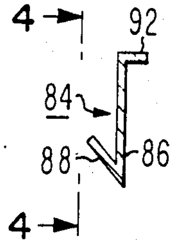
FIG. 3 is a longitudinal cross-sectional view of a gasket retainer according to the present invention.

With reference to FIGS. 2, 3 and 4, the r.f. gasket retainer 84 comprises a continuous elongated strip of substantially flat resilient material such as beryllium-copper, phosphor bronze or hard brass having a thickness of about 0.2 mm, an overall length of about 15.7 mm and a width of about 4.8 mm. The resilient material is bent to form a substantially V-shaped envelope engaging portion including a long leg section 86 which extends at least partially along the first portion 36 of the peripheral sidewall of the output support ring 30. A short leg section 88, contiguous with one end of the long leg section 86 is formed at an acute angle of about 45 degrees with the long leg section 86. The short leg section 88 spans a gap 90 which exists between the first portion 36 of the peripheral sidewall of the output support ring 30 and the inner surface of the cylindrical weld flange 40. The short leg section 88 contacts the inner surface of the weld flange 40. Since the r.f. gasket retainer 34 is formed of resilient material, the short leg section 88 exerts an outwardly directed force against the inner surface of the weld flange 40 sufficient to frictionally retain the gasket retainer 84 in position and to urge the long leg section 86 against the first portion 36 of the peripheral sidewall of the output support ring 30. The opposite end of the long leg section 86 is formed to provide a contiguous gasket engaging portion 92, which makes an acute angle of less than about 90 degrees with the long leg section 86. The gasket engaging portion 92 is oppositely directed relative to the short leg section 88 and has a length sufficient to contact the top surface of the r.f. gasket 82 and to retain the r.f. gasket 82 against the flat support surface 34 of the output support ring 30. In the preferred embodiment, the r.f. gasket retainers 84 are formed to have a long-leg section 86 that is about 10.2 mm long, a short leg section 88 about 3.0 mm long and a gasket engaging portion about 2.5 mm long. These values, of course, are only illustrative and will vary depending upon the size of the magnetron 10, the length of the first sidewall portion 36 and the width of the gap 90 between the first sidewall portion 36 and the inner surface of the weld flange 40. Likewise, the angles disclosed herein may be varied somewhat and still be within the scope of the invention. To facilitate bending, the grain direction of the resilient material should be oriented along the longitudinal direction of the elongated strip of resilient material as shown in FIG. 4.

What is claimed is:

1. In a magnetron having an evacuated envelope including an output dome insulator affixed to a conductive annular output support ring, said output support ring having a substantially flat support surface adjacent to said output dome insulator and a step-like peripheral sidewall including a first portion and an outwardly extending second position, a weld flange circumscribing said support ring and being attached to said second portion of said peripheral sidewall, a conductive annular radio frequency (r.f.) gasket disposed on said flat support surface of said output support ring, wherein the improvement comprising a plurality of gasket retainers disposed around the periphery of said r.f. gasket, each of said gasket retainers comprising a continuous elongated strip of substantially flat resilient material bent to form a substantially V-shaped envelope engaging portion, said envelope engaging portion including a long leg section extending along said first portion of said peripheral sidewall of said output support ring and a short leg section contiguous with one end of said long leg section and in contact with said weld flange circumscribing said output support ring, said short leg section being wholly disposed within a gap formed between said first portion of said peripheral sidewall and an inner surface of said weld flange, said short leg section exerting a force to frictionally retain said gasket retainer in position and to urge said long leg section against said first portion of said peripheral sidewall of said output support ring, each of said gasket retainers further including a gasket engaging portion contiguous with the other end of said long leg section for contacting said retaining said r.f. gasket against said flat support surface of said output support ring.

2. The magnetron described in claim 1 wherein said short leg section of said envelope engaging portion of each of said gasket retainers forms an acute angle with said long leg section thereof.

3. The magnetron as in claim 2 wherein said acute angle is about 45 degrees.

4. The magnetron as in claim 1 wherein said gasket engaging portion of each of said gasket retainers forms an angle of less than about 90 degrees with said long leg section of said envelope engaging portion.

5. The magnetron as in claim 1 wherein at least four gasket retainers are disposed uniformly around the periphery of said r.f. gasket.

6. The magnetron as in claim 1 wherein said gasket retainers are formed from resilient material selected from the group comprising beryllium-copper, phosphor bronze and hard brass.

7. The magnetron as in claim 6 wherein said resilient material has a direction of grain growth extending longitudinally along the elongated strip.

8. In a magnetron having an evacuated envelope including an anode cylinder having a plurality of radial anode vanes secured to the inner surface thereof, a pair of magnetic pole pieces disposed on opposing ends of said anode cylinder and attached thereto, a cathode assembly disposed within said anode cylinder, an antenna connected at one end to the radial anode vanes and extending through one of said pole pieces, an output dome insulator enclosing said antenna, said output dome insulator being attached to a conductive annular output support ring, said support ring having a substantially flat support surface adjacent to said output dome insulator, said support ring having a step-like peripheral sidewall including a first portion and an outwardly directed second portion, a weld flange circumscribing said support ring and being attached to said second portion of said peripheral sidewall, said weld flange being secured to an upper anode flange portion of said anode cylinder, an annular r.f. gasket disposed on said flat support surface of said output support ring, wherein the improvement comprising a plurality of gasket retainers disposed around the periphery of said r.f. gasket, each of said gasket retainers comprising a continuous elongated strip of substantially flat resilient material bent to form a substantially V-shaped envelope engaging portion, said envelope engaging portion comprising a long leg section extending along and contacting said first portion of said peripheral sidewall of said output support ring and a short leg section contiguous with one end of said long leg section and in contact with a said weld flange circumscribing said output support ring, said short leg section being wholly disposed within a gap formed between said first portion of said peripheral sidewall and an inner surface of said weld flange, said short leg section exerting a force to frictionally retain said gasket retainer in position and to urge said long leg section against said first portion of said peripheral sidewall of said output support ring, each of said gasket retainers further including a gasket engaging portion contiguous with said long leg section, said gasket engaging portion being in contact with said RF gasket to retain said gasket against said flat support surface of said output support ring.

* * * * *